US007263243B2

(12) United States Patent
Chen et al.

(10) Patent No.: US 7,263,243 B2
(45) Date of Patent: Aug. 28, 2007

(54) METHOD OF IMAGE REGISTRATION USING MUTUAL INFORMATION

(75) Inventors: Shoupu Chen, Rochester, NY (US); Lawrence A. Ray, Rochester, NY (US); Nathan D. Cahill, West Henrietta, NY (US); Marvin M. Goodgame, Ontario, NY (US); Cranos M. Williams, Morrisville, NC (US)

(73) Assignee: Carestream Health, Inc., Rochester, NY (US)

( * ) Notice: Subject to any disclaimer, the term of this patent is extended or adjusted under 35 U.S.C. 154(b) by 849 days.

(21) Appl. No.: 10/747,594

(22) Filed: Dec. 29, 2003

(65) Prior Publication Data

US 2005/0147325 A1 Jul. 7, 2005

(51) Int. Cl.
G06K 9/32 (2006.01)
G06K 9/00 (2006.01)
(52) U.S. Cl. ...................... 382/294; 382/128
(58) Field of Classification Search ........ 382/128–134, 382/274, 276, 294; 600/407; 424/9.4
See application file for complete search history.

(56) References Cited

U.S. PATENT DOCUMENTS

| 6,343,143 | B1 | 1/2002 | Guillemaud et al. | 382/130 |
| 6,728,424 | B1* | 4/2004 | Zhu et al. | 382/294 |
| 6,975,750 | B2* | 12/2005 | Yan et al. | 382/118 |
| 7,035,431 | B2* | 4/2006 | Blake et al. | 382/103 |

FOREIGN PATENT DOCUMENTS

WO    WO 02/23477 A2    3/2002

OTHER PUBLICATIONS

P. Viola and W.M. Wells III, "Alignment by maximization of mutual information" in the *Proceedings of International Conference on Computer Vision*, IEEE Computer Society Press, Los Alamitos, CA, 1995, pp. 16-23.
J.P. Pluim, J.B. Maintz, and M.A. Viergever. "Image Registration by Maximization of Combined Mutual Information and Gradient Information", *IEEE Transactions on Medical Imaging*, vol. 19, No. 8, 2000, pp. 809-814.
"Vector Quantization". http://www.geocities.com/mohamedqasem/vectorquantization/vq.html.
"An Algorithm for Vector Quantizer Design" by Yoseph Linde, Andres Buzo, and Robert M. Gray. *IEEE Transactions on Communictions*, vol. Com-28, No. 1, Jan.1980.

* cited by examiner

*Primary Examiner*—Kanjibhai Patel

(57) ABSTRACT

A digital image processing method for image registration, that acquires a reference intensity image and a floating intensity image that is to be registered; and preprocesses the reference and the floating images, before converting the preprocessed reference image to a vectorized reference image. Subsequently, the vectorized reference image is converted to a reference index image. Additional image processing includes spatially transforming the preprocessed floating image using a transformation matrix; converting the transformed floating image to a vectorized floating image; converting the vectorized floating image to a floating index image; and obtaining joint statistics of the index images. Other steps include, computing a cost function due to misalignment of the two images using the joint statistics; and updating the transformation matrix and repeating several aforementioned steps, if the cost function does not satisfy a predefined criterion, otherwise, applying the transformation matrix to an acquired floating intensity image.

26 Claims, 5 Drawing Sheets

METHOD OF IMAGE REGISTRATION USING MUTUAL INFORMATION

FIELD OF THE INVENTION

The present invention relates generally to the field of digital image processing, and in particular to image registration.

BACKGROUND OF THE INVENTION

Medical imaging diagnostics has been a growing area of research in the past several decades. In many cases, image fusion, or the combination of multiple associated images to form a composite image integrating the data therefrom is often desirable in a clinical setting. The first step in combining multiple associated images involves a spatial alignment of these images, a process known as image registration. Image registration is the act of spatially mapping the coordinate system of one image to the coordinate system of another image.

WO Patent application No. 02/23477 A2, assigned to Zhu, Yang-Ming and Cochoff, Steven M., and incorporated herein by reference, teaches a method of image registration by employing a registration processor to calculate a statistical measure of likelihood for two volumetric images based on an assumption that the images are probabilistically related. The likelihood is calculated using mutation probabilities (either calculated from prior knowledge of the image relationship or estimated purely from the image data) for some or all voxel pairs in the overlapping volume. The likelihood is calculated for a plurality of transformations in iterative fashion until a transformation that maximizes the likelihood is found. The transformation that maximizes likelihood provides an optimal registration of the two images.

U.S. Pat. No. 6,343,143 B1, assigned to Regis Guillemaud and Sebastien Durbec, and incorporated herein by reference, teaches a method of image registration that consists of breaking down each of the images into space components representing the distribution of the gray levels of the image, applying a phase registration method to the components to bring about a correspondence between the components of one image with those of the other image, summating all the results of the bringing into correspondence and detecting, in the image resulting from said sum, the maximum gray level defining the transformation between the two initial images.

P. Viola and W. M. Wells III teach a method (see "Alignment by maximization of mutual information," in the proceedings of *International Conference on Computer Vision*, pp. 16-23, IEEE Computer Society Press, Los Alamitos, Calif., 1995, http://citeseer.nj.nec.com/cache/papers/cs/17410/ftp: zSzzSzftp.ai.mit.eduzSzpubz SzuserszSzswzSzpaperszSz-iccv-95.pdf/viola95alignment.pdf) that aligns two images by adjustment of the relative pose until the mutual information between the two images is maximized.

A drawback of the above methods is that the dependence of the gray values of neighboring voxels is ignored. The assumption of independence does not hold in general. Incorporating the dependence of the gray values of neighboring voxels, i.e., the spatial information of a voxel, could improve registration.

J. P. Pluim, J. B. Maintz, and M. A. Viergever teach a method (see "Image Registration by Maximization of Combined Mutual Information and Gradient Information," *IEEE Transactions on Medical Imaging*, vol. 19, no. 8, pp. 809-814, 2000, http://www.isi.uu.nl/People/Josien/Papers/Pluim_TMI_19_8.pdf) that incorporates gradient information of the involved images into the registration process using the mutual information technique. This method requires separate gradient images (information) in addition to intensity images. It would be desirable to include spatial information of a voxel within the mutual information technology without the need for separate gradient images.

There is a need therefore for an improved image registration method that overcomes the problems set forth above.

These and other aspects, objects, features and advantages of the present invention will be more clearly understood and appreciated from a review of the following detailed description of the preferred embodiments and appended claims, and by reference to the accompanying drawings.

SUMMARY OF THE INVENTION

The need is met according to the present invention by proving a digital image processing method for image registration that includes the steps of: (a) acquiring a reference intensity image and a floating intensity image that is to be registered; (b) preprocessing the reference and the floating images; (c) converting the preprocessed reference image to a vectorized reference image; (d) converting the vectorized reference image to a reference index image; (e) spatially transforming the preprocessed floating image using a transformation matrix; (f) converting the transformed floating image to a vectorized floating image; (g) converting the vectorized floating image to a floating index image; (h) obtaining joint statistics of the index images; (i) computing a cost function due to misalignment of the two images using the joint statistics; and (j) updating the transformation matrix and repeating steps (e), (f), (g), (h), and (i) if the cost function does not satisfy a predefined criterion, otherwise, applying the transformation matrix to acquired floating intensity image.

DETAILED DESCRIPTION OF THE INVENTION

Figure 1:
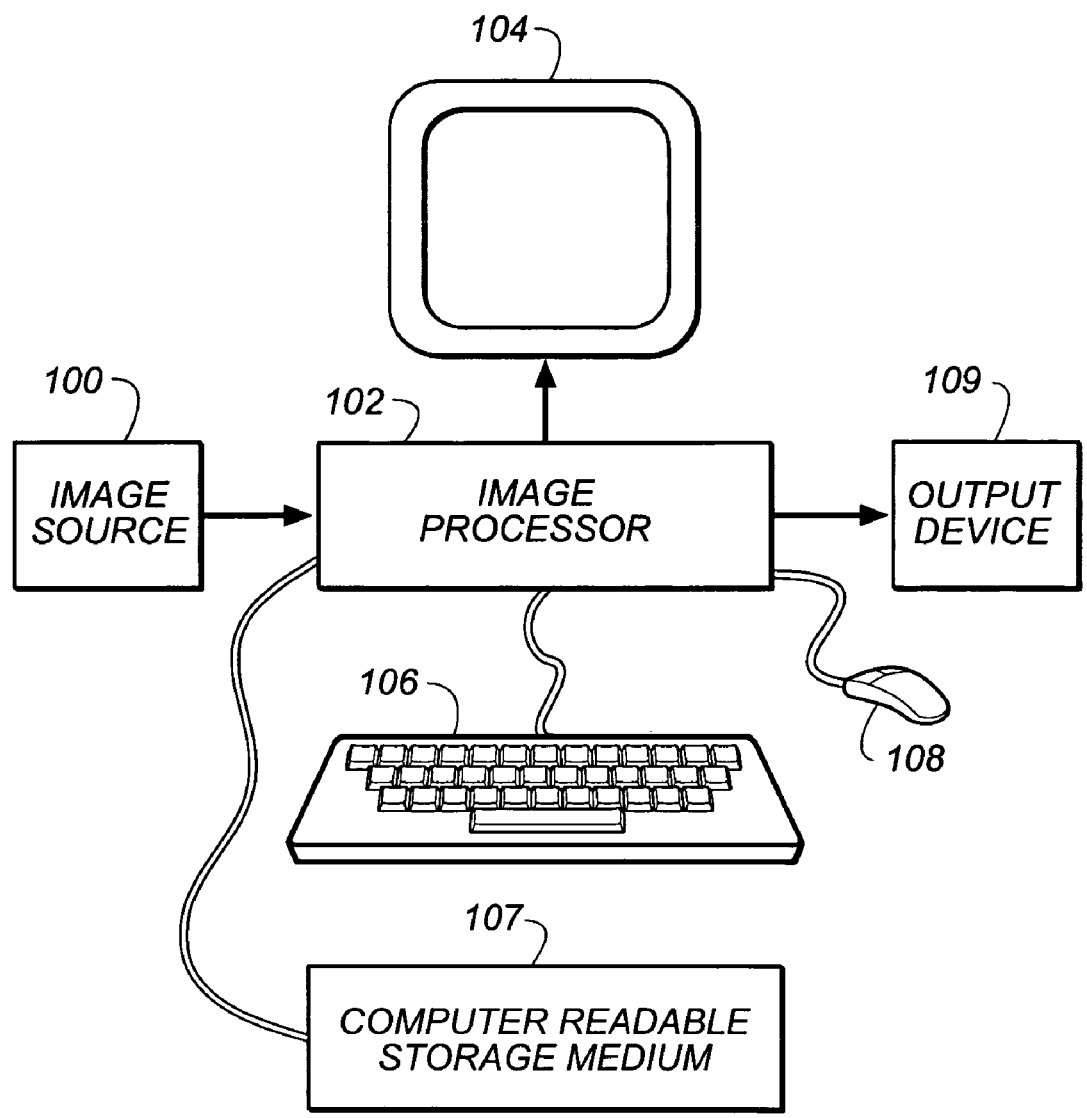
FIG. 1 is a perspective diagram of a computer system for implementing the present invention.

FIG. 1 shows an image processing system useful in practicing the present invention. Said system includes a digital image source 100, such as an MRI machine (not shown), a CT scanner (not shown), or a digital image storage device (such as a compact disk drive with a Picture CD). The digital image from the digital image source 100 is provided to an image processor 102, such as a programmable personal computer, or digital image processing work station such as a Sun Sparc workstation. The image processor 102 may be connected to a CRT display 104, an operator interface such as a keyboard 106, and a mouse 108. Image processor 102 is also connected to computer readable storage medium 107.

The image processor 102 transmits processed digital images to an output device 109. Output device 109 can comprise a hard copy printer, a long-term image storage device, a connection to another processor, or an image telecommunication device connected, for example, to the Internet.

In the following description, one embodiment of the present invention will be described as a method. However, in another embodiment, the present invention comprises a computer program product for registering two images in accordance with the method described. In describing the present invention, it should be apparent that the computer program of the present invention could be utilized by any well-known computer system, such as the personal computer of the type shown in FIG. 1. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or cooperating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware.

Figure 2A:
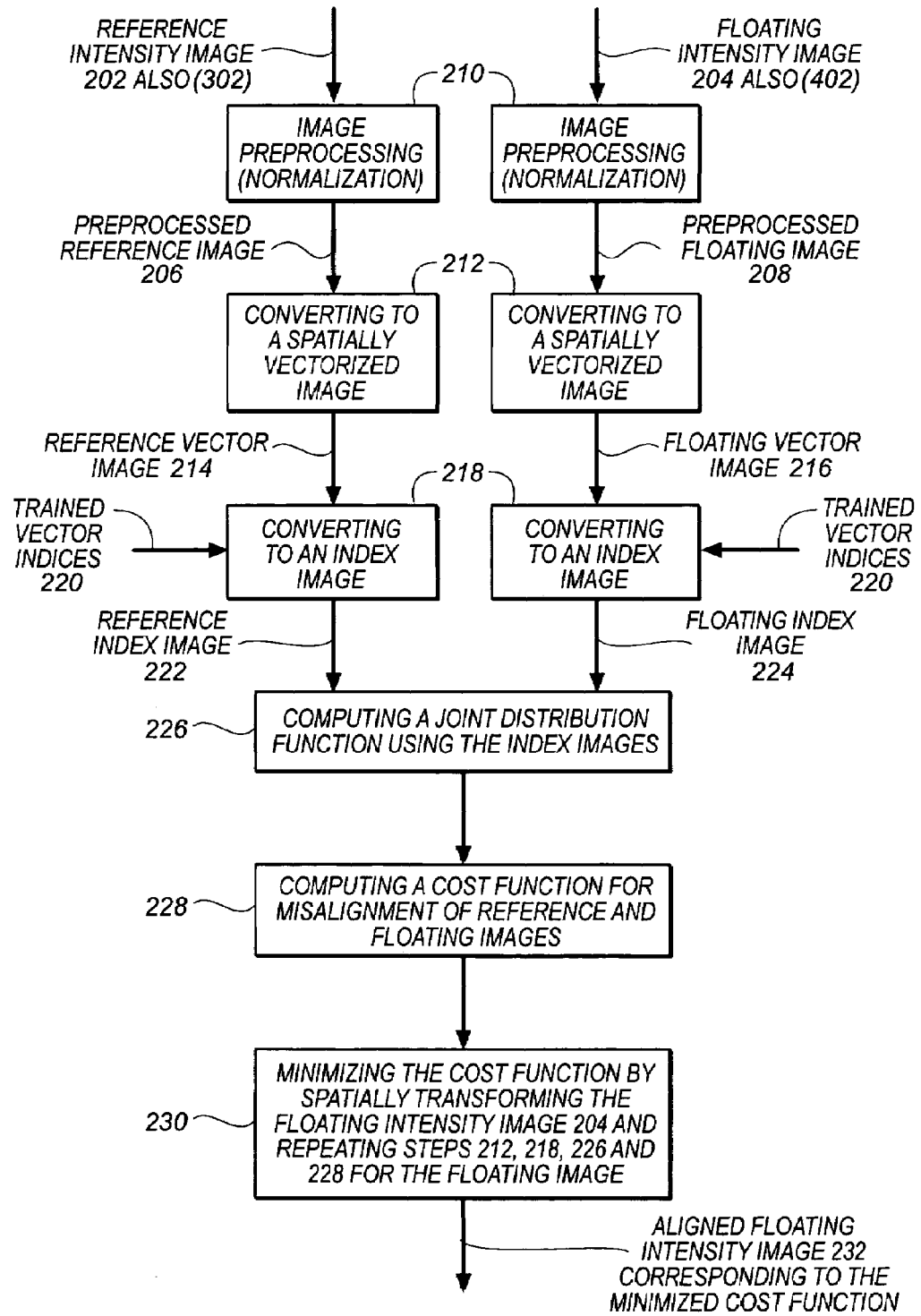
FIG. 2A is a flowchart illustrating the image registration method of the present invention.
Figure 3:
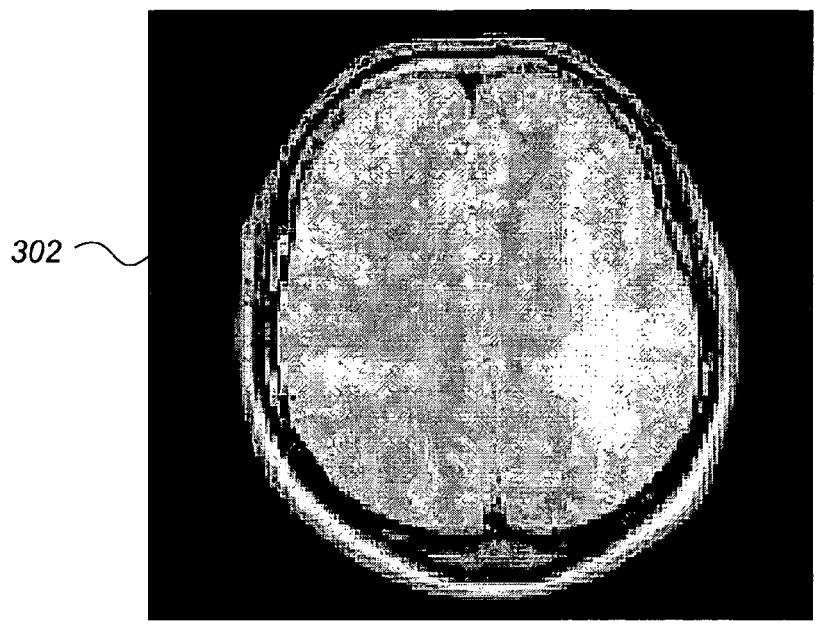
FIG. 3 is an illustration of a reference image.
Figure 4:
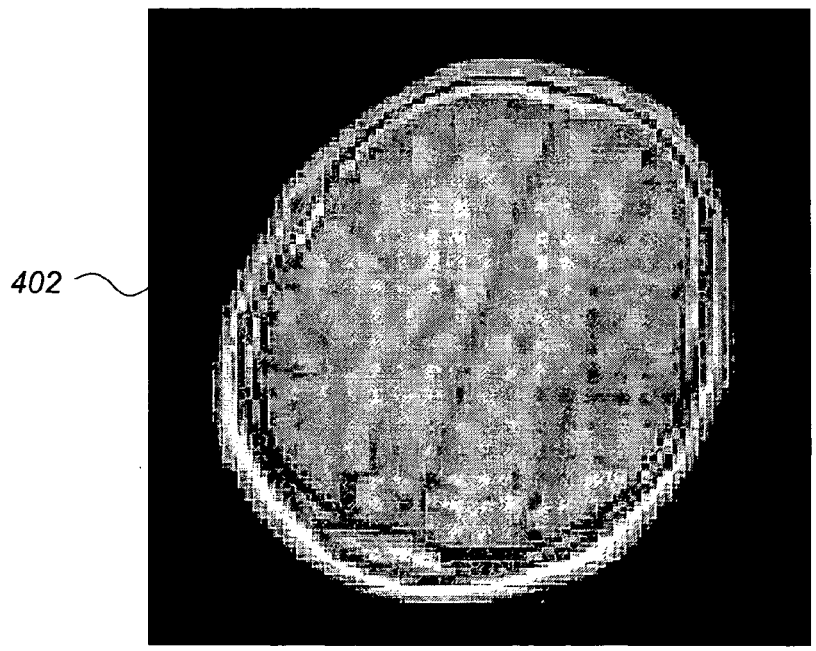
FIG. 4 is an illustration of a floating image.

Referring to FIG. 2A, the method of the present invention will now be outlined. FIG. 2A is a flowchart illustrating an embodiment of the image registration method of the present invention. Given two images to be registered, one image is denoted as a reference image 202 and the other as a floating image 204, as shown in FIG. 2A. An exemplary reference image 302 is shown in FIG. 3. An exemplary floating image 402 is shown in FIG. 4. The floating image is to be spatially transformed until it is aligned spatially with the reference image for the two images to be superimposed. Both the reference intensity image 202 and the floating intensity image 204 are first preprocessed in step 210. In the embodiment of the image registration method of the present invention shown in FIG. 2A, a preferred preprocess is an image normalization step. The normalization step is useful for the present invention when the reference image 202 (exemplary reference image 302 in FIG. 3) and the floating image 204 (exemplary floating image 402 in FIG. 4) come from different imaging modalities, for example, MRI and CT. People skilled in the art will understand that the normalization operation in the preprocess can be skipped, and a similar operation can be carried out in subsequent steps to have equivalent effect. People skilled in the art will also recognize that other operations such as noise reduction, histogram equalization, edge preserving filtering, etc. can be included in the preprocessing 210.

A drawback of the conventional image registration methods such as those using mutual information is that the dependence of the intensity values of neighboring pixels is ignored. This assumption of independence does not hold in general. Incorporating the dependence of the intensity values of neighboring pixels, i.e., the spatial information of a pixel, could improve registration. Therefore, in the present invention, the preprocessed reference image 206 and the preprocessed floating image 208 are converted to a reference vector image 214 and a floating vector image 216, respectively, through a step of Converting to a Spatially Vectorized Image 212. This conversion involves the neighborhood of pixels around each pixel. The intensities in the neighborhood are transformed into a 1-D vector. A U×V neighborhood window is centered at the pixel to be converted. The 1-D vector of intensities then replaces said pixel. Now, the new pixel contains spatial (structural) information of the local surrounding region. An exemplary method of transforming the intensities in the neighborhood into a 1-D vector could be a raster scanning row by row of the neighborhood pixels. People skilled in the art are capable of using other more sophisticated transforming methods such as a rotationally invariant transformation.

After step 212, the original image is defined in a vector space. It is convenient to represent the vector space by a set of numbers, for example, indices. Each vector in the vector space is assigned to a single value (index). This is done in step 218 of Converting to an Index Image, resulting in a reference index image 222 and a floating index image 224.

A preferred method for converting the vector images 214 and 216 to index images 222 and 224 is the well-known method of vector quantization (see http://www.geocities.com/mohamedgasem/vectorquantization/vq.html).

Vector quantization (VQ) is the process of reducing a family of vectors by mapping M k-dimensional vectors in the vector space $R^k$ into a set of N k-dimensional vectors where M>N. The collection of N vectors is known as the codebook, and the elements of the codebook are known as codewords. A vector in $R^k$ is associated with a vector in the codebook using a minimum Euclidean distance measure. Formally stated, given a codebook Y $$\forall\ y_i \in Y, i=1, 2, \ldots, N$$

there exists a Voronoi region $V_i$ such that $$V_i = \{x \in R^k : \|x-y_i\| \leq \|x-y_j\|, \forall\ j \neq i\}$$

The set of Voronoi regions partition the entire space $R^k$ such that:

$$\bigcup_{i=1}^{N} V_i = R^k \quad \text{and} \quad \bigcap_{i=1}^{N} V_i = \varnothing$$

The entire process is essentially similar to "rounding off" to the nearest integer.

The design of the codebook that best represents a set of input vectors is a NP-hard problem. An exhaustive search is required for the best possible set of codewords in a space, and the search increases exponentially as the number of codewords and vector dimensions increases. This difficulty leads to the use of techniques that are simple to implement even though they yield sub-optimal solutions. One such technique is called the LBG algorithm, named after its authors Linde, Buzo, and Gray (see "An Algorithm for Vector Quantizer Design," IEEE Trans. Communication, COM28 (1), pp. 84-95, January 1980). The algorithm is stated below:

1.) Determine the number of codewords, N.
2.) Select N codewords at random, and let that be the initial codebook that contains the codewords.
3.) Use the Euclidean distance measure to cluster the vectors around each codeword.
4.) Compute the new set of codewords by obtaining the average of each cluster.
5.) Repeat steps 2 and 3 until either the codewords do not change or the change in the codewords is small.

Figure 5:
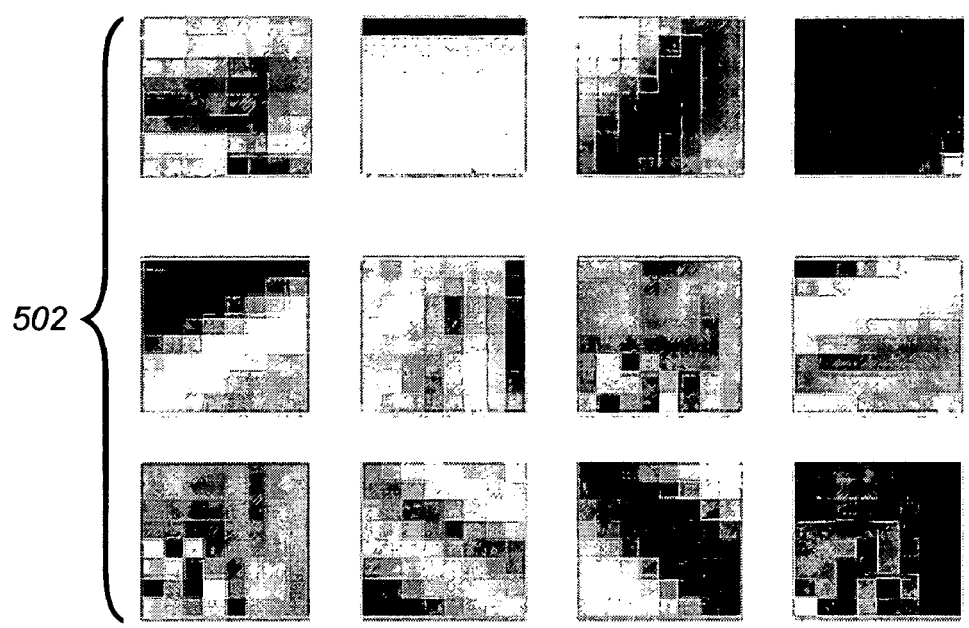
FIG. 5 is an illustration of neighborhood regions.

Pre-selected sample images are used to generate the codebook. An exemplary sample image is the reference image 302 shown in FIG. 3. A vector is formed by obtaining the U×V (e.g., 9×9) neighborhood for each image pixel. Examples of 8×8 exemplary neighborhoods 502 are shown in FIG. 5. Vectors formed from sample images are used to train the codewords by iterating the LBG algorithm until the codewords converge.

The above technique is adopted to generate vector indices 220, which are representatives of the codewords. Exemplary representatives are integers.

The reference index image 222 and floating index image 224 are used in the subsequent steps 226, 228, 230 in FIG. 2A to complete the registration (alignment) process. Common steps to align two images are:

1) Choose a cost function that will determine the degree of misalignment between the reference image and the spatially transformed floating image. Also, choose a stopping point (satisfied minimum cost) that indicates the images are aligned (registered).
2) Optimize the transformation on the floating image such that the stopping point (satisfied minimum cost) is met.

Registration (alignment) methods such as cross-correlation and mutual information are some of the more commonly used techniques found in the literature. Correlation techniques perform well in mono-modal registration wherein there is a linear relationship between the measurements for the same spatial elements in the two images. However, because of the non-linear relationship that can arise between the intensities of images across different modalities, correlation has been shown generally not to be a suitable candidate for a cost function in multi-modal image registration. A much more suitable cost function is mutual information, which is a statistical measure that assesses the strength of dependence between two stochastic variables. Since its introduction in 1995 by Viola and Wells, mutual information has been one of the most widely acclaimed registration measures for multi-modal image registration. Therefore, mutual information is currently selected as a preferred cost function for the present invention.

Mutual information (MI) as a statistical measure finds its roots in information theory. Mutual information is a measure of how much information one random variable contains about another. The MI of two random variables A and B is defined as $$I(A, B) = \sum_{a,b} p_{A,B}(a, b) \log \frac{p_{A,B}(a, b)}{p_A(a) \cdot p_B(b)} \quad (1)$$

where $p_{A,B}(a, b)$ is the joint probability distribution function (pdf) of the random variables A and B, and $P_A(a)$ and $p_B(b)$ are the marginal probability distribution functions for A and B, respectively.

The mutual information can also be written in terms of the marginal and joint entropy of the random variables A and B as follows $$I(A, B) = H(A) + H(B) - H(A, B) \quad (2)$$

where H(A) and H(B) are the entropies of A and B, respectively, and H(A, B) is the joint entropy between the two random variables. They are defined as $$H(A) = -\sum_{a} p_A(A) \log p_A(A) \quad (3)$$

$$H(A, B) = -\sum_{a,b} p_{A,B}(a, b) \log p_{A,B}(a, b) \quad (4)$$

One interpretation of entropy is as a measure of uncertainty of a random variable. A distribution with only a few large probabilities has a low entropy value; the maximum entropy value is reached for a uniform distribution. The entropy of an image indicates how difficult it is to predict the gray value of an arbitrary point in the image. MI is bounded by cases of either complete dependence or complete independence of A and B, yielding values of I=H and I=0, respectively, where H is the entropy of A or B.

In FIG. 2A, the reference index image 222 and floating index image 224 serve as the random variables A and B. In working with images, the functional form of the joint pdf is not readily accessible. Therefore, in a step of Computing a Joint Distribution Function using the index images 226, a joint histogram of the values for each image (222 and 224) approximates the joint probability distribution function.

Figure 6:
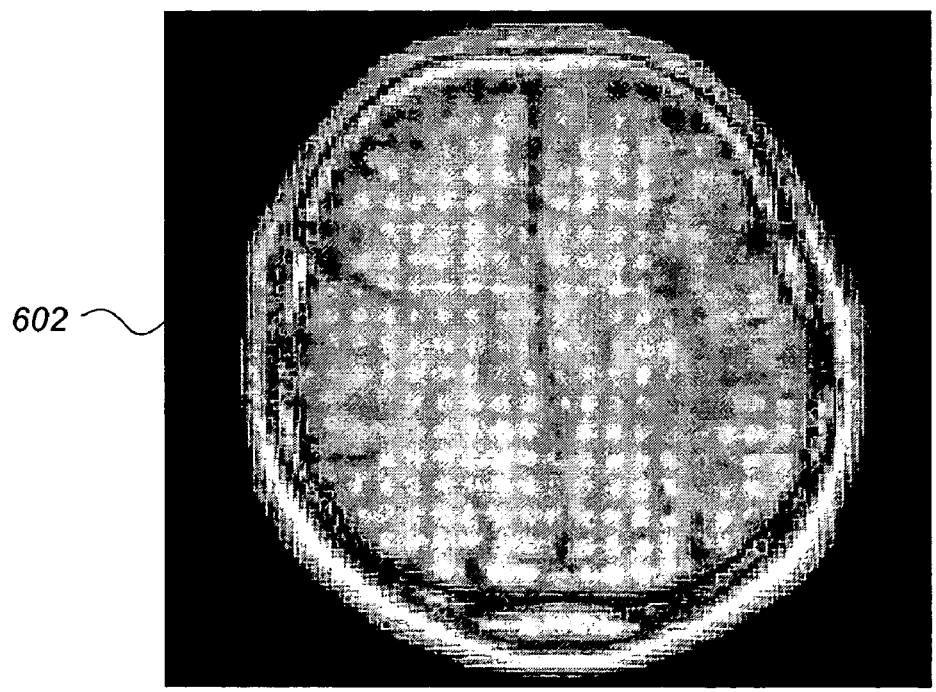
FIG. 6 is an illustration of a registered floating image.

The strength of the mutual information similarity measure lies in the fact that no assumptions are made regarding the nature of the relationship between the image values in both modalities, except that such a relationship exists. This is not the case for correlation methods, which depend on a linear relationship between image intensities. For image registration, the assumption is that maximization of the MI is equivalent to correctly registering the images. Maximizing the MI is equivalent to minimizing the joint entropy. The joint entropy is minimized when the joint pdf of A and B contains a few sharp peaks. This occurs when the images are correctly aligned. When the images are mis-registered, however, new combinations of intensity values from A and B will be aligned in the joint pdf, which cause dispersion in the distribution. This dispersion leads to a higher entropy value. Because a cost function must reach its minimum value when two images are aligned, a suitable cost function would be either joint entropy or negative mutual information. In a step of Computing a Cost Function for Misalignment of Reference and Floating Images 228, the cost function (negative mutual information) of the two images to be aligned is computed. The alignment is an iterative process involving spatially transforming the floating image (see step 230 in FIG. 2A) using, for example, rotation, translation or affine transformations. If the two images are not aligned, the cost function computed in step 228 does not reach its minimum or meet a predefined criterion. Then the alignment process performs spatial transformation on the floating image 208 and repeats steps 212, 218, 226, and 228. The output of step 230 is an Aligned floating intensity image 232 such as the exemplary registered (aligned) floating image 602 shown in FIG. 6. Details of the registration alignment steps are given below.

Denote the reference image as R, and the floating image as F. The floating image F is transformed by some linear transformation until it is spatially aligned with the reference image R. Let $T_{\vec{\alpha}}$ be the linear transformation with the parameter $\vec{\alpha}$. The number of elements in $\vec{\alpha}$ determines the degrees of freedom. For this 2-D application, an affine transformation with six degrees of freedom is chosen as an exemplary transformation to perform the registration. The transformation is given as $$F' = T_{\vec{\alpha}}(F) \text{ or} \quad (5)$$

$$\begin{bmatrix} x' \\ y' \\ 1 \end{bmatrix} = \begin{bmatrix} a_{11} & a_{12} & t_x \\ a_{21} & a_{22} & t_y \\ 0 & 0 & 1 \end{bmatrix} \begin{bmatrix} x \\ y \\ 1 \end{bmatrix} \quad (6)$$

$$\vec{\alpha} = \lfloor a_{11} \; a_{12} \; a_{21} \; a_{22} \; t_x \; t_y \rfloor \quad (7)$$

where (x, y) are coordinates in the floating image F and (x', y') are coordinates in the transformed floating image F'. It is obvious that the selection of $T_{\vec{\alpha}}$ is not restricted to the transformation matrix given in (6). Other transformation matrices can be used based on the assumptions made regarding the nature of the mis-registration.

For a given reference image R, a floating image F', and a transformation $T_{\vec{\alpha}}$, the MI is calculated by $$I(R, F', T_{\vec{\alpha}}) = \sum_{m,f'} p_{M,F'}(m, f') \log \frac{p_{M,F}(m, f')}{p_M(m) \cdot p_{F'}(f')} \quad (8)$$

where the transformation that correctly registers the images is given by $$T_{\vec{\alpha}_{reg}} = \arg \max I(R, F', T_{\vec{\alpha}}) \quad (9)$$

or $$T_{\vec{\alpha}_{reg}} = \arg \min -I(R, F', T_{\vec{\alpha}}) \quad (10)$$

Figure 2B:
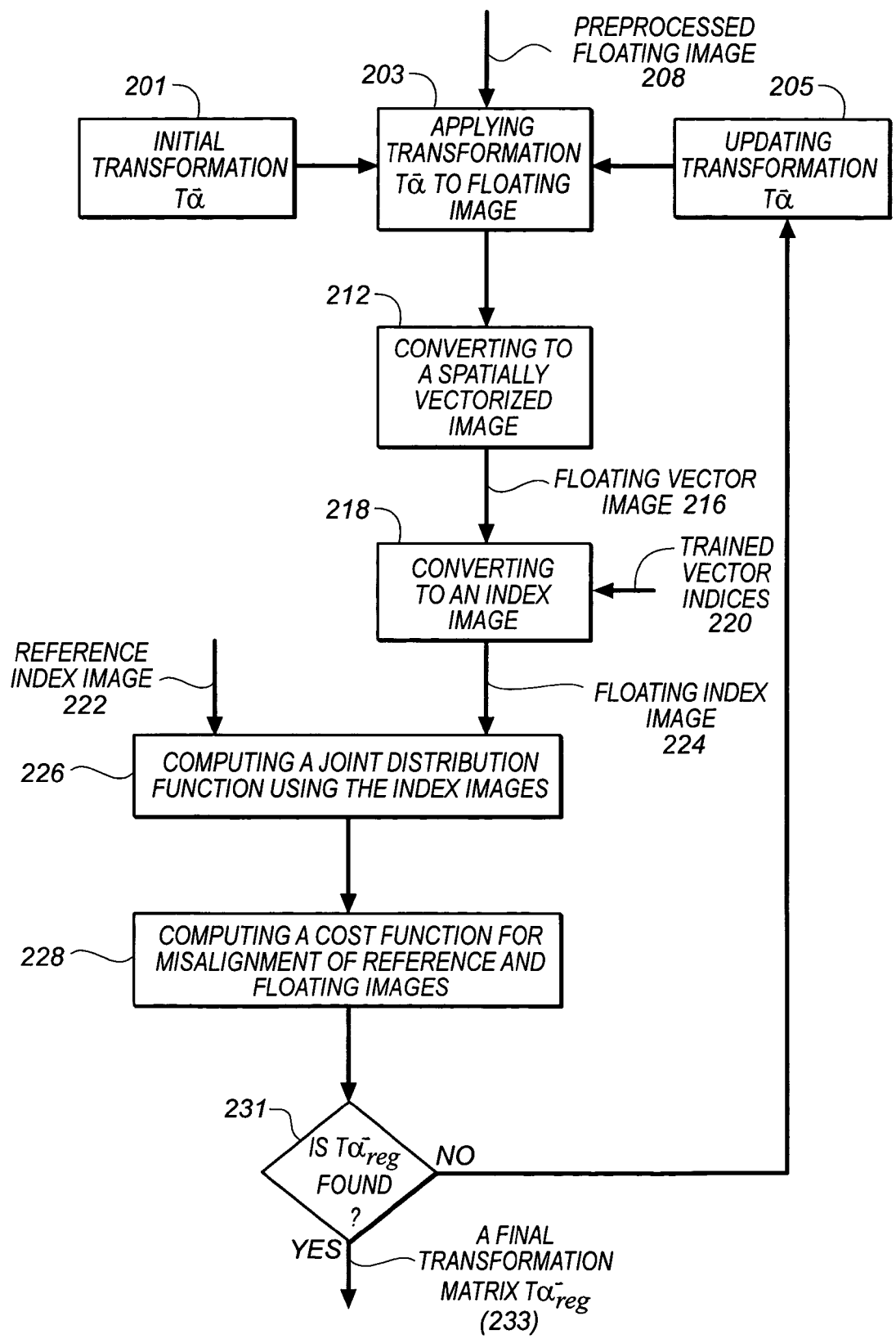
FIG. 2B is a flowchart illustrating a method of updating a transformation matrix for image registration.

The process of Equation (10) is illustrated in FIG. 2B. Equation (10) implies that the transformation matrix $T_{\vec{\alpha}}$ is updated in step 205 shown in FIG. 2B in the minimization process by changing the parameter $\vec{\alpha}$. The updated transformation matrix $T_{\vec{\alpha}}$ is applied to floating image 208 in step 203. New mutual information is then computed and evaluated (in steps 226, 228 and 231). These steps are repeated until the cost function (−I) reaches a minimum (a query step 231). After a final transformation matrix $T_{\vec{\alpha}_{reg}}$ (233) is found, it is then applied to the floating image F (204) to produce $F_{reg}'$. The reference image R and the registered floating image $F_{reg}'$ are compared to test how well the registration process performed.

The initial estimation step 201 in FIG. 2B for the transformation parameters of matrix $T_{\vec{\alpha}}$ is made based on a rough alignment using principal component analysis. With this technique, the rotation is estimated by finding the difference between the principal component angles. The initial value of the translation in the x and y directions is estimated by comparing the center of gravity (COG) of the two images. The scale in the x and y directions is estimated by finding the width of the images along both principal axes. The ratios of these widths are calculated and used as scale approximations. Given the initial guess $$\vec{\alpha}_o = \lfloor a_{11_o} \; a_{12_o} \; a_{21_o} \; a_{22_o} \; t_{x_o} \; t_{y_o} \rfloor \quad (11)$$

an optimization routine based on a simplex algorithm was used to find the maximum value of I (or the minimum value (minimum cost) of −I) for the transformation $T_{\vec{\alpha}}$ as shown in (9) and (10). The MI given in (1) is calculated by generating a joint histogram based on the intensities of both the reference image R and the transformed floating image F'. Calculation of the MI based on this joint histogram can yield a function with spurious local minima. These local minima can be eliminated by utilizing a number of techniques, e.g., blurring the images before calculating I, blurring the joint histogram, or partial volume interpolation.

The specific algorithm (image registration using mutual information) disclosed in the preferred embodiment of the present invention may stand alone or may be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm(s) themselves can be fully automatic, may have user input (be fully or partially manual), may have user or operator review to accept/reject the result, or may be assisted by metadata (metadata that may be user supplied, supplied by a measuring device (e.g. in an image capturing device), or determined by an algorithm). Moreover, the algorithm(s) may interface with a variety of workflow user interface schemes.

The invention has been described in detail with particular reference to certain preferred embodiments thereof, but it will be understood that variations and modifications can be effected within the spirit and scope of the invention.

PARTS LIST

100 image source
102 image processor
104 image display
106 data and command entry device
107 computer readable storage medium
108 data and command control device 109 output device
201 a step
202 reference intensity image
203 a step
204 floating intensity image
205 a step
206 preprocessed reference image
208 preprocessed floating image
210 a step
212 a step
214 reference vector image
216 floating vector image
218 a step
220 trained vector indices
222 reference index image
224 floating index image
226 a step
228 a step
230 a step
231 a query
232 aligned floating intensity image
233 a final transformation matrix
302 an image
402 an image
502 images
602 an image

What is claimed is:

1. A digital image processing method for image registration using statistical information, comprising the steps of:
   a) applying vector quantization to a plurality of digital images to convert the plurality of digital images to vectorized images having corresponding local intensity information as derived respectively from the plurality of digital images;
   b) employing the vectorized images to obtain a joint statistical representation of the plurality of digital images;
   c) computing a cost function using the joint statistical representation of the plurality of digital images;
   d) selecting a reference image from the plurality of digital images;
   e) spatially transforming the plurality of digital images excluding the reference image, where a predetermined cost function criterion is unsatisfied; and
   f) repeating steps a-c, where the predetermined cost function criterion is unsatisfied, for the plurality of digital images that have been previously spatially transformed in order to align the plurality of digital images with the reference image.

2. The digital image processing method for image registration claimed in claim 1, wherein the joint statistical representation of the plurality of digital images is a joint intensity distribution.

3. The digital image processing method for image registration claimed in claim 2, wherein the cost function is mutual information derived from the joint intensity distribution.

4. The digital image processing method for image registration claimed in claim 1, further comprising the step of:
   g) applying image normalization to the plurality of digital images.

5. The digital image processing method for image registration claimed in claim 1, wherein the step of employing the vectorized images to obtain a joint statistical representation of the plurality of digital images further includes the steps of:
   b1) converting the vectorized image to an indexed image; and
   b2) using the indexed image to compute the joint statistical representation of the plurality of digital images.

6. The digital image processing method for image registration claimed in claim 1, wherein the step of spatially transforming the plurality of digital images includes at least one of the steps of:
   e1) translating the plurality of digital images in a two dimensional image space;
   e2) rotating the plurality of digital images in the two dimensional image space; and
   e3) affine transforming the plurality of digital images in the two dimensional image space.

7. A digital image processing method for image registration using mutual information comprising the steps of:
   a) acquiring a reference intensity image and a floating intensity image that is to be registered;
   b) preprocessing the reference and the floating images
   c) converting the preprocessed reference image to a vectorized reference image;
   d) converting the vectorized reference to a reference index image;
   e) spatially transforming the preprocessed floating image using a transformation matrix;
   f) converting the transformed floating image to a vectorized floating image;
   g) converting the vectorized floating image to a floating index image;
   h) obtaining joint statistics of the index images;
   i) computing a cost function due to misalignment of the two images using the joint statistics; and
   j) updating the transformation matrix and repeating steps e), f), g), h), and i) if the cost function does not satisfy a predefined criterion, otherwise, applying the transformation matrix to the acquired floating intensity image.

8. The digital image processing method for image registration claimed in claim 7, wherein the joint statistics of the index images is a joint intensity distribution.

9. The digital image processing method for image registration claimed in claim 8, wherein the cost function is mutual information derived from the joint intensity distribution.

10. The digital image processing method for image registration claimed in claim 7, further comprising the step of:
    k) applying image normalization to the plurality of digital images.

11. The digital image processing method for image registration claimed in claim 7, wherein the step of spatially transforming the plurality of digital images includes at least one of the steps of:
    e1) translating the plurality of digital images in a two dimensional image space;
    e2) rotating the plurality of digital images in the two dimensional image space; and
    e3) transforming the plurality of digital images in the two dimensional image space into affine transformations.

12. The digital image processing method for image registration claimed in claim 1, wherein the predetermined cost function criterion is a predetermined numeric threshold.

13. The digital image processing method for image registration claimed in claim 7, wherein the predefined criterion is a predetermined numeric threshold.

14. A computer storage medium having instructions stored therein for causing a computer to perform the method of claim 1.

15. A computer storage medium having instructions stored therein for causing a computer to perform the method of claim 2.

16. A computer storage medium having instructions stored therein for causing a computer to perform the method of claim 3.

17. A computer storage medium having instructions stored therein for causing a computer to perform the method of claim 4.

18. A computer storage medium having instructions stored therein for causing a computer to perform the method of claim 5.

19. A computer storage medium having instructions stored therein for causing a computer to perform the method of claim 6.

20. A computer storage medium having instructions stored therein for causing a computer to perform the method of claim 7.

21. A computer storage medium having instructions stored therein for causing a computer to perform the method of claim 8.

22. A computer storage medium having instructions stored therein for causing a computer to perform the method of claim 9.

23. A computer storage medium having instructions stored therein for causing a computer to perform the method of claim 10.

24. A computer storage medium having instructions stored therein for causing a computer to perform the method of claim 11.

25. A computer storage medium having instructions stored therein for causing a computer to perform the method of claim 12.

26. A computer storage medium having instructions stored therein for causing a computer to perform the method of claim 13.

* * * * *